United States Patent Office 3,499,920
Patented Mar. 10, 1970

3,499,920
PROCESS FOR PREPARING N-METHYL-GLYCINONITRILE
David A. Daniels, Catonsville, Md., assignor to W. R. Grace & Co., New York, N.Y., a corporation of Connecticut
No Drawing. Filed Dec. 21, 1967, Ser. No. 692,293
Int. Cl. C07c 121/42, 101/04
U.S. Cl. 260—465.5                                    10 Claims

ABSTRACT OF THE DISCLOSURE

In abstract, this invention is directed to a process for preparing N-methylglycinonitrile by; (a) forming a first mixture by mixing methylamine and hydrogen cyanide at about 0–25° C. and in a mole ratio of about 1–2:1; (b) adding an aqueous formaldehyde solution analyzing about 25–50% HCHO to the first mixture while maintaining the temperature thereof at about 0–25° C.; and (c) recovering the thus formed product, all as recited hereinafter.

---

This invention is in the field of N-methylglycinonitrile (sarcosinonitrile) preparation.

Prior art methods for preparing sarcosinonitrile are taught by U.S. Patents 3,009,954 and 2,720,540.

In summary, this invention is directed to a process for preparing N-methylglycinonitrile, said process comprising: (a) forming a first mixture by adding methylamine and hydrogen cyanide to a reaction zone, said methylamine and said hydrogen cyanide being added in a mole ratio of about 1–2:1 while maintaining the temperature within said reaction zone at about 0–25° C.; (b) forming a second mixture, said second mixture consisting essentially of N-methylglycinonitrile and water, by adding an aqueous formaldehyde solution to said first mixture in said reaction zone while maintaining the temperature within said zone at about 0–25° C., said formaldehyde solution analyzing about 25–50% HCHO, said formaldehyde solution being added at a rate to provide about 0.5–1 mole of HCHO per mole of methylamine present in said first mixture; and (c) recovering said second mixture.

In preferred embodiments of the process set forth in the above summary:

(1) The methylamine is an aqueous methylamine solution analyzing about 20–45% $CH_3NH_2$;
(2) The methylamine is substantially anhydrous;
(3) The hydrogen cyanide is substantially anhydrous hydrogen cyanide;
(4) The methylamine and hydrogen cyanide are added to the reaction zone in a mole ratio of about 1.01–1.5:1;
(5) The temperature within the reaction zone is maintained at about 0–15° C. while forming the first mixture;
(6) The aqueous formaldehyde solution analyzes 37–50% HCHO;
(7) The formaldehyde solution is added at a rate to provide about 0.65–1 mole of HCHO per mole of methylamine present in the first mixture; and
(8) The temperature within the reaction zone is maintained at about 0–15° C. while adding the formaldehyde solution.

In another embodiment (Embodiment A) this invention is directed to a process for preparing a sarcosinonitrile solution comprising adding methylamine selected from the group consisting of substantially anhydrous methylamine and aqueous methylamine solutions analyzing about 20–45% $CH_3NH_2$, substantially anhydrous hydrogen cyanide, and an aqueous formaldehyde solution analyzing about 25–50% HCHO to a reaction zone while maintaining the temperature within said reaction zone at about 0–45° C. the hydrogen cyanide and the formaldehyde solution being added at such rates that, at all times during the addition of said methylamine, said hydrogen cyanide, and said formaldehyde solution, the mole ratio of hydrogen cyanide added to said reaction zone to HCHO added to said reaction zone is at least about 1:1, and recovering the thus formed sarcosinonitrile solution.

It is an object of this invention to provide a method for synthesizing sarcosinonitrile.

It is an object of this invention to provide an improved method for preparing high quality sarcosinonitrile from methylamine, hydrogen cyanide, and formaldehyde.

It is another object of this invention to provide a method for synthesizing sarcosinonitrile of exceptionally high quality.

It is another object of this invention to prepare sarcosinonitrile which is substantially free of side-products such as N-methyliminodiacetonitrile ($CH_3N(CH_2CN)_2$) and the like.

As used herein (e.g., in part (b) of the summary, supra, and in the claims) the expression "said formaldehyde solution being added at a rate to provide about 0.5–1 mole of HCHO per mole of methylamine present in the first mixture" means that formaldehyde solution is added to the first mixture at a rate to provide about 0.5–1 mole of HCHO for each mole of methylamine added to the aforesaid reaction zone where preparing the aforesaid first mixture. Of course, it is understood that methylamine, being a weak base ($K_b$=ca. $4.4\times10^{-4}$), and hydrogen cyanide, being a very weak acid ($K_a$=ca. $7.2\times10^{-10}$), may react to at least some extent in the reaction zone wherein the first mixture is formed. Nevertheless, it is clearly understood that, from the standpoint of the stoichiometry involved, substantially all methylamine fed into the reaction zone where preparing the first mixture is present in said first mixture in a form capable of reacting with hydrogen cyanide and formaldehyde to form sarcosinonitrile.

Sarcosinonitrile prepared by the process of this invention has been used with excellent results as an intermediate in the preparation of sodium sarcosinate (by the hydrolysis of sarcosinonitrile with aqueous sodium hydroxide); said sodium sarcosinate has, in turn, been acylated with acyl chlorides of fatty acids having about 8–20 carbon atoms to yield surfactants which have been used with excellent results in shampoos (including rug shampoos) floor waxes, and glass cleaners. The derivative prepared by reacting lauroyl chloride with sodium sarcosinate has been especially useful for such purposes.

The instant invention will be better understood by referring to the following specific but nonlimiting examples. It is understood that said invention is not limited to these examples which are offered merely as illustrations, and it is also understood that modifications can be made without departing from the spirit and scope of the invention.

EXAMPLE I 3 moles of $CH_3NH_2$ (232.8 g. of 40% aqueous solution) were placed in a four neck flask and cooled to about 0° C. then 2.6 moles of HCN (100 ml.) were added and the temperature held below 20° C. There was a noticeable exotherm. The solution was clear and colorless. Then 2.5 moles of HCHO (202.5 g. of 37% soln.) was added with the temperature held below 20° C. As the HCHO was being added the color became light yellow and became somewhat deeper yellow as the last of the formaldehyde solution was added. Gas chromatography established that the organic reaction product was substantially pure sarcosinonitrile.

EXAMPLE II 1 mole of methylamine (CH₃NH₂, 77.6 g. 40% aqueous solution) was cooled to 0° C. and 0.6 mole of liquid substantially hydrocyanic acid was slowly added. The reaction was very exothermic and addition of HCN had to be carefully controlled. When the HCN addition was finished the material was clear. Then 0.5 mole of formaldehyde (HCHO, 40.5 g. of a 37% aqueous solution) was slowly added while keeping the temperature about 0° C. This reaction was very exothermic, the addition taking about 1 hour and 15 minutes. At the end of the formaldehyde addition the reaction product was a clear colorless solution. The total reaction mixture volume was 140 ml. and the pH 11.8 Gas chromatography showed that the organic product was substantially pure sarcosinonitrile.

EXAMPLE III 3 moles of CH₃NH₂ (232.8 g. of 40% solution) was placed in a 4 neck 1 liter flask equipped with a magnetic stirrer, a reflux condenser, a thermometer, a pH probe, and a magnetic stirrer. The CH₃NH₂ was cooled to below 20° C. then 2.6 moles of liquid substantially anhydrous HCN was slowly added keeping the temperature below 20° C. Then 2.5 moles (202.5 g. of a 37% aqueous solution) of HCHO was slowly added while keeping the temperature below 20° C. The solution turned faint yellow color during the HCHO addition. A gas chromatographic analysis of the reacted material showed that only sarcosinonitrile had been formed. The final pH of the material is 11.6.

EXAMPLE IV 3 moles (232.8 g. of 40% aqueous solution) of

CH₃NH₂ was placed in a 4 neck 1 liter flask equipped with a magnetic stirrer, a reflux condenser, a thermometer, a pH probe, a claisen tube, and two dropping funnels. The temperature was brought to 20° C. with an ice-methanol bath and then 28 ml. (0.7 mole) of substantially anhydrous liquid HCN was added while keeping the temperature below 10° C. At this point HCHO addition was started and HCN and HCHO were added concurrently. The rate of addition being such that the final 2.2 moles (88 ml.) of HCN was added while 2.18 moles of HCHO (176.4 g. of 37% aqueous solution) was added, thereby leaving 0.72 moles of HCHO (58.5 g. of 37% aqueous solution) to be added after the last of the HCN had been added. The temperature is kept below 5° C. during the addition sequence. The final pH is 11.4 and the color of the solution is water white and is clear. The HCN-HCHO addition time took 90 minutes and the resulting mixture (product) was stirred for an additional 15 minutes. A gas chromatographic analysis of the reaction product showed that sarcosinonitrile was the only product formed.

The above procedure (that of Example IV) illustrates an embodiment of the instant invention in which two of the reactants (hydrogen cyanide and formaldehyde solution) can be added simultaneously to the reaction zone (a 4 neck flask in Example IV). It must be noted that where using this embodiment, the HCN and HCHO solution are added at such rates that the mole ratio of added HCN to added HCHO is never less than about 1:1.

In a modification of Example IV (Example IV-A) the three reactants (methylamine, hydrogen cyanide, and formaldehyde solution) were added simultaneously. In this instance the hydrogen cyanide and formaldehyde solution were added at such rates that the mole ratio of added HCN to added HCHO was never less than about 1:1 at any time during the addition of the reactants. The results of this run (the run of Example IV-A) were indistinguishable from those of Example IV.

EXAMPLE V

In a 3 neck 3 liter flask equipped with a stirrer, a reflux condenser, a dropping funnel, and a thermometer was placed 15 moles of CH₃NH₂ (1164 g. of a 40% aqueous solution). The contents of the reaction flask was cooled to less than 15° C. using an ice-methanol bath. To this was slowly added 13 moles (520 ml.) of HCN while keeping the temperature below 15° C. As the last of the HCN was added, the solution turned faintly yellow. Then 12.5 moles (1013 g. of 37% aqueous solution) of HCHO was added while keeping the temperature about 5° C. The color deepened slightly as the HCHO was added. A gas chromatographic analysis of the mixture showed that sarcosinonitrile was the only reaction product formed.

Substantially identical results have been obtained where using substantially anhydrous methylamine.

Substantially identical results have been obtained where using methylamine solutions analyzing about 20, 25, 38, and 45% CH₃NH₂.

Substantially identical results have been obtained where using formaldehyde solutions analyzing about 25, 30, 45, 48, and 50% HCHO.

If desired sarcosinonitrile prepared by the method of the instant procedure can be separated from the water present in the aforesaid second mixture by adding hydrogen chloride (or hydrochloric acid), thereby to precipitate said sarcosinonitrile as a hydrochloride. Alternatively, an alkali metal bisulfate (e.g., NaHSO₄ or KHSO₄) can be added, and the sarcosinonitrile is recovered as a bisulfate. However, I generally prefer to recover the sarcosinonitrile as an aqueous solution or aqueous slurry.

Also, if desired, an alkali metal hydroxide (e.g., NaOH or KOH) can be added to the aforesaid mixture and the sarcosinonitrile can be hydrolyzed to the corresponding alkali metal sarcosinate (e.g., CH₃NHCH₂COONa or CH₃NHCH₂COOK).

The term "percent (%)" as used herein, unless otherwise defined where used, means parts per hundred by weight, and the term "parts" as used herein, unless otherwise defined where used, means parts by weight.

I claim:
1. A process for preparing N-methylglycinonitrile, said process comprising:
    (a) forming a first mixture by adding methylamine and hydrogen cyanide to a reaction zone, said methylamine and said hydrogen cyanide being added in a mole ratio of about 1–2:1 while maintaining the temperature within said reaction zone at about 0–25° C.;
    (b) forming a second mixture, said second mixture consisting essentially of N-methylglycinonitrile and water, by adding an aqueous formaldehyde solution to said first mixture in said reaction zone while maintaining the temperature within said zone at about 0–25° C., said formaldehyde solution analyzing about 25–50% HCHO, said formaldehyde solution being added at a rate to provide about 0.5–1.0 mole of HCHO per mole of methylamine present in said first mixture; and
    (c) recovering said second mixture.
2. The process of claim 1 in which the methylamine is an aqueous methylamine solution analyzing about 20–45% CH₃NH₂.
3. The process of claim 1 in which the methylamine is substantially anhydrous.
4. The process of claim 1 in which the hydrogen cyanide is substantially anhydrous liquid hydrogen cyanide.
5. The process of claim 1 in which methylamine and hydrogen cyanide are added to the reaction zone in a mole ratio of about 1.01–1.5:1.
6. The process of claim 1 in which the temperature within the reaction zone is maintained at about 0–15° C. while forming the first mixture.
7. The process of claim 1 in which the aqueous formaldehyde solution analyzes about 35–50% HCHO.

8. The process of claim 1 in which the formaldehyde solution is added at a rate to provide about 0.65–1 mole of HCHO per mole of methylamine present in the first mixture.

9. The process of claim 1 in which the temperature within the reaction zone is maintained at about 0–15° C. while adding the formaldehyde solution.

10. A process for preparing a sarcosinonitrile solution comprising adding methylamine selected from the group consisting of substantially anhydrous methylamine and aqueous methylamine solutions analyzing about 20–45% $CH_3NH_2$, substantially anhydrous hydrogen cyanide, and an aqueous formaldehyde solution analyzing about 25–50% HCHO to a reaction zone while maintaining the temperature within said reaction zone at about 0–45° C. the hydrogen cyanide and the formaldehyde solution being added at such rates that, at all times during the addition of said methylamine, said hydrogen cyanide, and said formaldehyde solution, the mole ratio of hydrogen cyanide added to said reaction zone to HCHO added to said reaction zone is at least about 1:1, and recovering the thus formed sarcosinonitrile solution.

References Cited

UNITED STATES PATENTS 3,009,954  11/1961  Leake et al. _____ 260—465.5 XR

JOSEPH P. BRUST, Primary Examiner

U.S. Cl. X.R.

260—534